(12) United States Patent  
Grigg et al.

(10) Patent No.: US 8,977,251 B2  
(45) Date of Patent: Mar. 10, 2015

(54) TRANSFERRING CONTENT TO A MOBILE DEVICE

(75) Inventors: David M. Grigg, Rock Hill, SC (US); Elizabeth S. Votaw, Potomac, MD (US); Alicia C. Jones, Fort Mill, SC (US); Patrick Brian Kelly, Charlotte, NC (US); Marc B. Keller, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 860 days.

(21) Appl. No.: 13/018,000

(22) Filed: Jan. 31, 2011

(65) Prior Publication Data

US 2012/0196586 A1 Aug. 2, 2012

(51) Int. Cl.
*H04M 3/00* (2006.01)
*H04B 5/00* (2006.01)
*H04M 1/725* (2006.01)

(52) U.S. Cl.
CPC ........ *H04B 5/0031* (2013.01); *H04M 1/7253* (2013.01); *H04M 2250/04* (2013.01)
USPC ........... 455/420; 455/415; 455/406; 455/407; 455/408; 455/414.1; 455/414.2; 455/456.3

(58) Field of Classification Search
USPC ............. 705/10, 26.1, 41; 455/415, 406–408, 455/414.1, 414.2, 420, 456.3
See application file for complete search history.

(56) References Cited

U.S. PATENT DOCUMENTS

| | | | |
|---|---|---|---|
| 2006/0219776 A1* | 10/2006 | Finn | 235/380 |
| 2007/0006327 A1 | 1/2007 | Lal et al. | |
| 2007/0255662 A1* | 11/2007 | Tumminaro | 705/79 |
| 2007/0293155 A1* | 12/2007 | Liao et al. | 455/41.2 |
| 2008/0010196 A1* | 1/2008 | Rackley, III et al. | 705/40 |
| 2008/0017704 A1* | 1/2008 | VanDeburg et al. | 235/380 |
| 2008/0045172 A1* | 2/2008 | Narayanaswami et al. | 455/187.1 |
| 2008/0048022 A1* | 2/2008 | Vawter | 235/380 |
| 2008/0052192 A1* | 2/2008 | Fisher | 705/26 |
| 2008/0208762 A1* | 8/2008 | Arthur et al. | 705/79 |
| 2008/0242274 A1 | 10/2008 | Swanburg et al. | |
| 2008/0275779 A1* | 11/2008 | Lakshminarayanan | 705/14 |
| 2008/0294556 A1* | 11/2008 | Anderson | 705/44 |
| 2009/0098825 A1* | 4/2009 | Huomo et al. | 455/41.1 |
| 2009/0144161 A1* | 6/2009 | Fisher | 705/16 |
| 2009/0191811 A1* | 7/2009 | Griffin et al. | 455/41.1 |
| 2009/0271211 A1* | 10/2009 | Hammad | 705/1 |
| 2011/0070837 A1* | 3/2011 | Griffin et al. | 455/41.3 |
| 2011/0165859 A1* | 7/2011 | Wengrovitz | 455/411 |

* cited by examiner

Primary Examiner — Amancio Gonzalez
(74) Attorney, Agent, or Firm — Michael A. Springs; Moore & Van Allen PLLC; Nicholas C. Russell

(57) ABSTRACT

In general, apparatuses, methods and computer program products for transferring content to a mobile device are disclosed. Particularly, a system is disclosed that provides for pushing content from an external apparatus such as an automated teller machine (ATM), smart poster, contactless payment terminal, etc. to a mobile device or allowing the mobile device to pull such content from the external apparatus. The content may include one or more coupons, ads, or offers, images, financial receipts, account-related documentation, a reissued card, a new card, a prepaid card, or the like.

33 Claims, 8 Drawing Sheets

TRANSFERRING CONTENT TO A MOBILE DEVICE

BACKGROUND

In today's "digital age," more and more processes are becoming digital or automated. This is especially true in the financial industry. Over the years, primary methods for payment have evolved from cash to checks to credit and debit cards. More recently, technology has become available that permits for "contactless" transactions. For instance, a contactless payment is a payment where a customer pays a purchase amount without handing a payment card or a payment device to a cashier at the point-of-sale (POS) and without swiping the magnetic stripe of a payment card through a payment terminal (also sometimes referred to as a POS terminal). In other words, a contactless payment is one made using a payment device that may wirelessly transmit payment information to the payment terminal. Although physical contact between the payment device and the payment terminal may still occur in a contactless payment environment, physical contact between the payment device and the payment terminal is not necessary for transmission of the payment information from the payment device to the payment terminal.

Many payment terminals have the ability to read and process electronic payment information such as credit card or debit card information received wirelessly from a mobile device (e.g., a cell phone or other handheld computer) that is brought close to the payment terminal. Mobile devices configured with contactless transaction technology are often referred to as "mobile wallets" or "electronic wallets."

A mobile device having mobile wallet capabilities may allow a user to use the mobile device's interface to interact with a contactless apparatus such as selecting a payment vehicle that the user wishes to use for paying a purchase amount. In such a contactless payment, the mobile device may transmit payment information associated with the selected payment vehicle when the mobile device is brought close to the payment terminal. A payment vehicle may be any payment instrument such as a credit account, debit account, bank card, or other instrument that can be used by one entity to pay another entity.

However, to date, numerous areas in business have not transitioned to the "digital age." For instance, coupons for POS transactions must still be manually collected, printed, received in the mail, etc., by the user and presented in "hard copy" format to a retailer. Businesses spend millions of dollars mailing customers or potential customers hard copy ads or offers. Customers receive paper receipts and other account-related documents for their financial transactions at automated teller machines (ATM), retailers, etc.

A need presently exists for a product that permits a user to receive content such as coupons, ads, offers, images, financial receipts, account-related documents, reissued financial cards, new financial cards, prepaid cards, etc., in a more efficient and effective way in the digital age.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing an apparatus (e.g., a system, computer program product, and/or other device), method, or a combination of the foregoing for transferring content to a mobile device. Particularly, embodiments of the present invention are directed to pushing content from an external apparatus such as an automated teller machine (ATM), smart poster, contactless payment terminal, etc. to a mobile device or allowing the mobile device to pull such content from the external apparatus. The content may include one or more coupons, ads, or offers, images, financial receipts, account-related documentation, a reissued card, a new card, a prepaid card, or combinations thereof.

In a first embodiment of the present invention, a method for transferring content to a mobile device is provided. The method includes establishing a contactless connection between a mobile device and an external apparatus. The mobile device includes a memory device, a user interface configured to present information to a user, a communication device, and a processing device operatively coupled to the memory device and the communication device. The method further includes transferring content from the external apparatus to the mobile device such that the content is stored, at least temporarily, in the memory device of the mobile device. The content includes on or more coupons, ads, or offers, images, financial receipts, account-related documentation, a reissued card, a new card, a prepaid card, or combinations thereof.

In a specific embodiment of the method, the mobile device is a mobile phone.

In some specific embodiments, the contactless connection is a near field communication (NFC) connection.

In some specific embodiments, the external apparatus is an automated teller machine (ATM). In other embodiments, the external apparatus is a smart poster. In still further embodiments, the external apparatus is a contactless payment terminal.

In further specific embodiments, the external apparatus is an ATM and the method further includes authenticating the user.

Additionally, in some specific embodiments, the content includes one or more coupons one or more coupons, ads, or offers. In some further embodiments, the content includes one or more third-party coupons, ads, or offers.

In further specific embodiments, the content transferred to the mobile device is based, at least in part, on the location of the user. In some embodiments, the location may be determined by the location of the external apparatus. In other embodiments, the location may be determined by a global positioning system (GPS).

In some specific embodiments, the content is pushed from the external apparatus to the mobile device. In other embodiments, the content is pulled from the external apparatus to the mobile device.

In still further specific embodiments, the mobile device includes a mobile wallet with a financial institution-specific mobile wallet application or program that is compatible with an ATM. In some embodiments, the content is automatically pushed or pulled to the mobile device based on user preferences set by the user.

In specific embodiments, the method further includes prompting the user that content is available for transfer from the external apparatus to the mobile device, and receiving input from the user to transfer the content to the mobile device.

In another aspect of the invention, an apparatus for transferring content to a mobile device is provided. The apparatus includes a memory device, a communication device, and a processing device operatively coupled to the memory device and the communication device. The processing device is configured to execute computer-readable program code to establish a contactless connection with a mobile device and transfer content to the mobile device. The transferred content is stored, at least temporarily, in the mobile device. The content includes one or more coupons, ads, or offers, images, financial receipts, account-related documentation, a reissued card, a new card, a prepaid card, or combinations thereof.

In specific embodiments, the mobile device is a mobile phone.

In further specific embodiments, the contactless connection is a near field communication (NFC) connection.

In some specific embodiments, the apparatus is an ATM. In other embodiments, the apparatus is a smart poster. In still further embodiments, the apparatus is a contactless payment terminal.

In further specific embodiments, the external apparatus is an ATM and the processing device is further configured to execute computer-readable program code to authenticate a user.

Additionally, in some specific embodiments, the content includes one or more coupons one or more coupons, ads, or offers. In some further embodiments, the content includes one or more third-party coupons, ads, or offers.

In further specific embodiments, the content transferred to the mobile device is based, at least in part, on the location of the user. In some embodiments, the location may be determined by the location of the external apparatus. In other embodiments, the location may be determined by a GPS.

In some specific embodiments, the processing device is further configured to execute computer-readable program code to push the content from the apparatus to the mobile device. In other embodiments, the processing device is further configured to execute computer-readable program code to allow the mobile device to pull the content from the apparatus to the mobile device.

In still further specific embodiments, the external apparatus is an ATM that is compatible with a financial institution-specific mobile wallet application for a mobile device. In some embodiments, the processing device is further configured to execute computer-readable program code to automatically push the content to the mobile device or allow the mobile device to pull the content to the mobile device based on user preferences set by the user.

In specific embodiments, the processing device is further configured to execute computer-readable program code to prompting a user that content is available for transfer from the apparatus to the mobile device, and receive input from the user to transfer the content to the mobile device.

In a still further aspect of the invention, a computer program product for transferring content to a mobile device is provided. The computer program product includes a non-transitory computer-readable medium that includes a first set of code for establishing a contactless connection between a mobile device and an external apparatus. The computer program further includes a second set of code for transferring content from the external apparatus to the mobile device to be stored, at least temporarily, in the memory device of the mobile device. The content includes one or more coupons, ads, or offers, images, financial receipts, account-related documentation, a reissued card, a new card, a prepaid card, or combinations thereof.

In specific embodiments, the mobile device is a mobile phone.

In further specific embodiments, the contactless connection is a near field communication (NFC) connection.

In some specific embodiments, the apparatus is an ATM. In other embodiments, the apparatus is a smart poster. In still further embodiments, the external apparatus is a contactless payment terminal.

In further specific embodiments, the external apparatus is an ATM and the computer product further includes a third set of code to authenticate a user.

Additionally, in some specific embodiments, the content includes one or more coupons one or more coupons, ads, or offers. In some further embodiments, the content includes one or more third-party coupons, ads, or offers.

In further specific embodiments, the content transferred to the mobile device is based, at least in part, on the location of the user. In some embodiments, the location may be determined by the location of the external apparatus. In other embodiments, the location may be determined by a GPS.

In some specific embodiments, the second set of code is further configured to push the content from the external apparatus to the mobile device. In other embodiments, the second set of code is configured to allow the mobile device to pull the content from the external apparatus to the mobile device.

In still further specific embodiments, the computer program product further includes a fourth set of code to make the computer program product compatible with a financial institution-specific mobile wallet application or program. In some embodiments, the computer program product further includes a fifth set of code to automatically push the content to the mobile device or allow the mobile device to pull the content to the mobile device based on user preferences set by the user.

In specific embodiments, the computer program product further includes a fifth set of code to prompt a user that content is available for transfer from the external apparatus to the mobile device. Additionally, the computer program product may include a sixth set of code to receive input from the user to transfer from the external apparatus to the mobile device.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
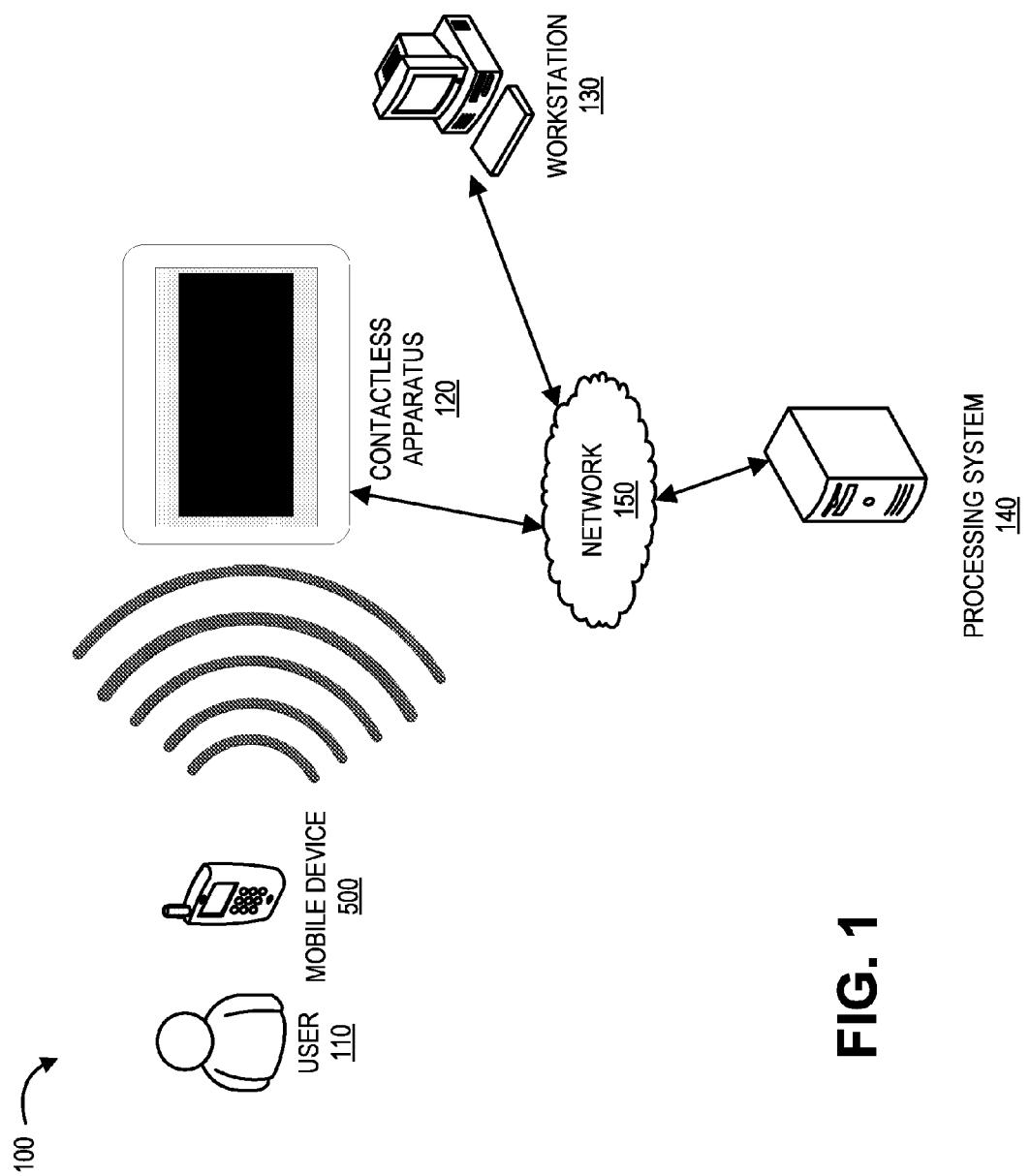
FIG. 1 illustrates a block diagram illustrating a contactless payment environment, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with embodiments of the invention, the term "entity" may refer to a customer, seller, merchant, or the like. In accordance with embodiments of the invention, the term "user" may refer to a customer or the like, who utilizes a mobile device capable of contactless transactions. In accordance with embodiments of the invention, the term "tap" or "tapping" may refer to bringing a mobile device close to or within the proximity of a payment terminal so that information can be communicated wirelessly between the mobile device and the payment terminal using short range wireless transmission technology, such near-field communication (NFC) technology, radio-frequency (RF) technology, or the like. Tapping may include physically tapping the mobile device against an appropriate portion of the payment terminal or it may include only waving or holding the mobile device near an appropriate portion of the payment terminal without making physical contact with the payment terminal.

In accordance with embodiments of the invention, the term "payment vehicle" may refer to an electronic payment vehicle, such as an electronic credit or debit card. The payment vehicle may not be a "card" at all and may instead be account identifying information stored electronically in a mobile device, such as in a cell phone. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the mobile device or may be inserted and removed from the mobile device by a user. In accordance with embodiments of the invention, the phrase "mobile wallet" refers to the hardware and/or software in a mobile device that enables the mobile device to be used to make contactless payments at a payment terminal.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like. In accordance with embodiments of the invention, the term "push" or "pushing" refers to content that is transferred from an apparatus to a user's mobile device. Content "pushed" to a mobile device from an apparatus may be done so without the user's authorization or presented to the user such that the user may confirm that they wish to receive such content. In accordance with embodiments of the invention, the term "pull" or "pulling" also refers to content that is transferred from an apparatus to a user's mobile device. However, contrary to "pushing," content "pulled" to a mobile device from an apparatus may be done so by a user specifically requesting that such content be transferred to the user's mobile device.

In general, embodiments of the present invention relate to apparatuses, methods, and computer program products for transferring content to a mobile device. Particularly, embodiments of the present invention are directed to pushing content from an external apparatus such as an automated teller machine (ATM), smart poster, contactless payment terminal, etc. to a mobile device or allowing the mobile device to pull such content from the external apparatus. The content may include one or more coupons, ads, or offers, images, financial receipts, account-related documentation, a reissued card, a new card, a prepaid card, or combinations thereof.

As a general matter, mobile wallet users have not freed themselves completely of their "wallet." Oftentimes, a user must carry paper coupons or receive hard-copy offers or ads, etc. Additionally, to date, mobile wallet users have generally only had the option of transmitting data without benefiting from receiving content directly to their mobile device during a contactless transaction, some of which content may be unrelated to the transaction.

In recognition of the above, generally, the present invention provides a system for transmitting content to a user's mobile device during a contactless transaction. Such a system is beneficial to businesses as it provides an avenue for marketing ventures as well as limiting hard-copy ads, offers, coupons, etc., costs associated with issuing financial cards, producing account-related documents, etc. Furthermore, the present invention permits POS-type marketing wherein a user's location as determined by the location of the apparatus the user is communicating with, by GPS positioning, mobile tower connection, etc., may be utilized to extend offers, coupons, ads, etc. to the user on behalf of nearby businesses or for the financial institution associated with the contactless apparatus (e.g., ATM) the user is communicating with. A user may be much more receptive to an offer received when the user is already present in the vicinity of the offering business in contrast to offers, coupons, ads, etc. received via mail or electronic mail.

Referring to FIG. 1, a block diagram illustrating a contactless transaction environment 100 configured for making a contactless transaction via a mobile device 500 is shown. As illustrated, the contactless transaction environment 100 may include a mobile device 500 operable by a user 110 who may be a customer who wants to make a contactless payment or other transaction via a mobile device 500. The contactless transaction environment 100 may also include a contactless apparatus 120 that may be automated or operable by a third party. The contactless apparatus 120 may permit a user to make a contactless payment or other transaction with a transaction device such as the mobile device 500.

The contactless transaction environment 100 may also include a workstation 130 and a processing system 140 that are in electronic communication with the contactless apparatus 120 via a network 150, which may be the Internet, an intranet or the like. The contactless apparatus may be any device capable of contactless communication with the mobile device, such as an ATM, smart poster, payment terminal, or the like.

In FIG. 1, the network 150 may include a local area network (LAN), a wide area network (WAN), and/or a global area network (GAN). The network 150 may provide for wireline, wireless, or a combination of wireline and wireless communication between devices in the network. In some embodiments, the network 150 includes the Internet. In some embodiments, the network 150 may include a wireless telephone network.

As illustrated in FIG. 1, a contactless apparatus 120 may be connected to a workstation 130 via the network 150. The workstation 130 may be used by a third party/entity to interact with the contactless apparatus 120. The workstation 130 may include various features, such as a network communication interface, a processing device, a user interface, and a memory device.

As used with respect to the workstation 130, a "communication interface" may generally include a modem, server, transceiver, and/or other device for communicating with other devices on a network. The network communication interface may be a communication interface having one or more communication devices configured to communicate with one or more other devices on the network 150, such as the contactless apparatus 130, the processing system 140, other processing systems, data systems, etc.

Additionally, referring to the workstation 130, a "processing device" may generally refer to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device may be configured to use the network communication interface to transmit and/or receive data and/or commands to and/or from the other devices connected to the network 150.

Furthermore, a "user interface" within the workstation 130 may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 110 or output data to the user 110. These input and output devices may include a display, mouse, keyboard, button, touchpad, touch screen, microphone, speaker, light, joystick, switch, and/or other customer input/output device for communicating with one or more customers.

A "memory device" within the workstation 130 may generally refer to a device or combination of devices that store one or more forms of computer-readable media for storing data and/or computer-executable program code/instructions. For example, the memory device may include any computer memory that provides an actual or virtual space to temporarily or permanently store data and/or commands provided to the processing device when it carries out its functions described herein.

Figure 2:
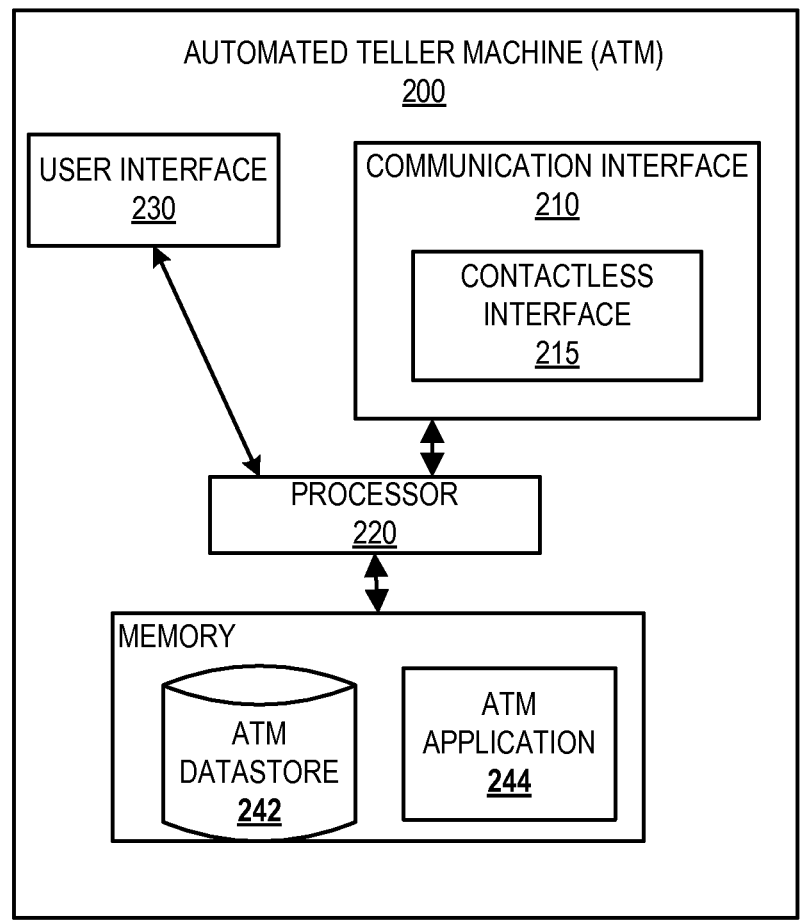
FIG. 2 illustrates a block diagram illustrating an ATM, in accordance with an embodiment of the invention.

The contactless apparatus 120 in the contactless transaction environment 100 may be an automated teller machine (ATM) 200. Referring to FIG. 2, the ATM 200 can include any ATM described and/or contemplated herein. As illustrated in FIG. 2, the ATM 200 includes a communication interface 210, a processor 220, a user interface 230, and a memory 240 having an ATM datastore 242 and an ATM application 244 stored therein. As shown, the processor 220 is operatively connected to the communication interface 210, the user interface 230, and the memory 240.

The communication interface 210 of the ATM may include a contactless interface 215. In one embodiment, the contactless interface is an NFC interface. The contactless interface 215 is configured to contactlessly and/or wirelessly send and/or receive information over relatively short ranges (e.g., within four inches, within three feet, etc.). The contactless interface 215 may include a transmitter, receiver, smart card, key card, proximity card, Bluetooth® device, radio frequency identification (RFID) tag and/or reader, and/or the like. In some embodiments, the contactless interface 215 communicates information via radio, IR, and/or optical transmissions. Generally, the contactless interface 215 is configured to operate as a contactless transmitter and/or as a contactless receiver. The contactless interface 215 functions to enable transactions with users operating a mobile wallet or other contactless transaction application. Also, it will be understood that the contactless interface 215 may be embedded, built, carried, and/or otherwise supported in and/or on the ATM 200. In some embodiments, the contactless interface 215 is not supported in and/or on the ATM 200, but the contactless interface 215 is otherwise operatively connected to the ATM 200 (e.g., where the contactless interface 215 is a peripheral device plugged into the ATM 200, etc.). The contactless interface 215 of the ATM 200 is configured to contactlessly and/or wirelessly communicate information to and/or from a corresponding contactless interface of another apparatus (e.g., a mobile device 500, etc.).

The communication interface 210 may generally also include a modem, server, transceiver, and/or other device for communicating with other devices on a network.

The user interface 230 of the ATM is generally like other user interfaces described herein. The interface 230 may include a display (e.g., a liquid crystal display, a touchscreen display, and/or the like) which is operatively coupled to the processor 220. The user interface may include any number of other devices allowing the ATM to transmit/receive data to/from a user, such as a keypad, keyboard, touch-screen, touchpad, microphone, mouse, joystick, other pointer device, button, soft key, and/or other input device(s).

As further illustrated in FIG. 2, the memory 240 may include an ATM application 244. It will be understood that the ATM application 244 can be executable to initiate, perform, complete, and/or facilitate one or more portions of any embodiment described and/or contemplated herein. Generally, the ATM application 244 is executable to receive transaction instructions from the user and perform typical ATM functions, as appreciated by those skilled in the art. In some embodiments of the invention, the ATM application is configured to access content, such as data stored in memory 240, for example in the ATM datastore 242, or a database in communication with the ATM 200 and transfer the content to the user's mobile device 500. The content may include coupons, ads, offers, images, financial receipts, account-related documentation, reissued account card, new account card, prepaid cards, or the like, discussed further below.

Of course, the ATM 200 may require users to identify and/or authenticate themselves to the ATM 200 before the ATM 200 will initiate, perform, complete, and/or facilitate a transaction. For example, in some embodiments, the ATM 200 is configured (and/or the ATM application 244 is executable) to authenticate an ATM user based at least partially on an ATM debit card, smart card, token (e.g., USB token, etc.), username, password, PIN, biometric information, and/or one or more other credentials that the user presents to the ATM 200. Additionally or alternatively, in some embodiments, the ATM 200 is configured to authenticate a user by using one-, two-, or multi-factor authentication. For example, in some embodiments, the ATM 200 requires two-factor authentication, such that the user must provide a valid debit card and enter the correct PIN associated with the debit card in order to authenticate the user to the ATM 200.

However, in some embodiments, the user may access the ATM 200 and receive content transferred to the mobile device 500 without authentication. Indeed, in one embodiment, the user may engage a contactless transaction and receive content, such as coupons, offers, etc. that may not require the security protocols necessary for other typical ATM transactions.

Figure 3:
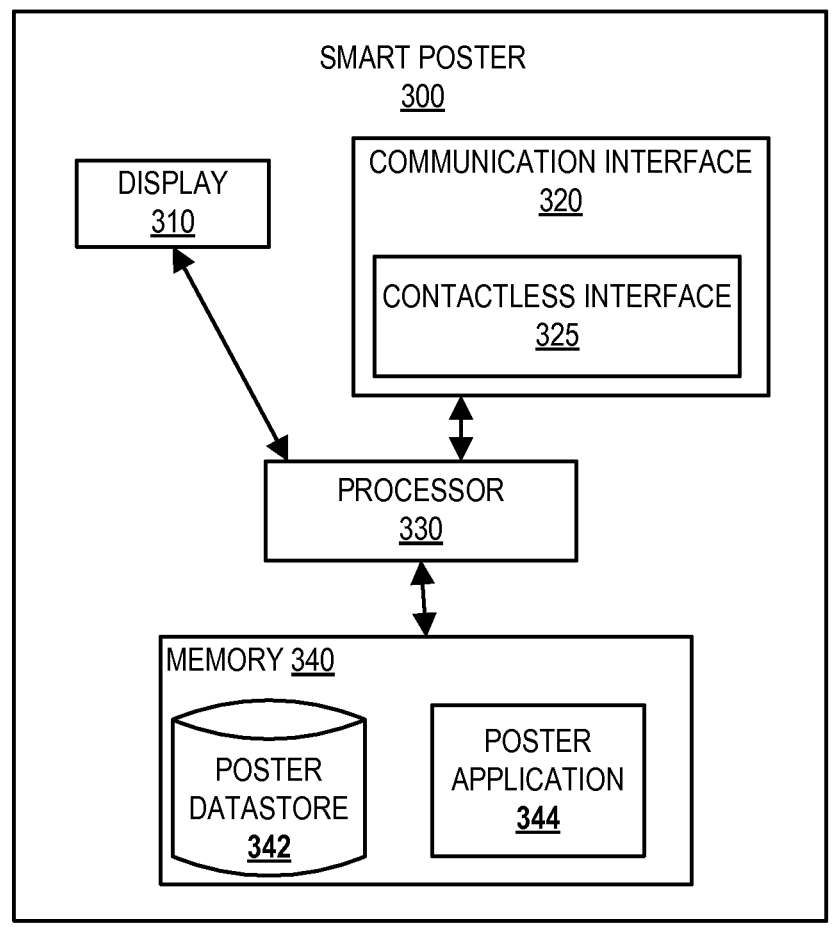
FIG. 3 illustrates a block diagram illustrating a smart poster, in accordance with an embodiment of the invention.

The contactless apparatus 120 may also be a smart poster 300. Referring to FIG. 3, one embodiment of a smart poster 300 is illustrated. As illustrated, the smart poster 300 includes a display 310, a communication interface 320, a processor 330, and a memory 340 having a poster datastore 342 and a poster application 344 stored therein. As shown, the processor 220 is operatively connected to the display 310, the communication interface 320, and the memory 340.

Typically, the display 310 includes a standard print media display bearing a printed poster with a contactless communication "tap point" designated within it. However, it will be appreciated that the display 310 can be a dynamic display such as a cathode ray tube, a liquid crystal, a plasma display, or the like. The use of such dynamic displays allows for video clips or changing elements of an advertising campaign to be displayed on the display 310. In embodiments incorporating a dynamic display, the tap point may typically be located on a frame or to the side of the display 310, but may be located within the bounds of the display 310.

Like with the ATM 200 described above, the communication interface 320 includes a contactless interface 325. In one embodiment, the contactless interface 325 is an NFC interface. The contactless interface 325 may operate in a manner similar to that described above with respect to the ATM 200. Additionally, the communication interface 320 may generally include a modem, server, transceiver, and/or other device for communicating with other devices on a network.

The memory 340 may include a poster application 344. The poster application 344 is generally executable to receive instructions from a user and to transmit content to a mobile device 500. The content may generally be coupons, ads, offers, images or the like and generally does not require any sort of user authentication to receive such content. However, in particular embodiments, the smart poster is in communication with an ATM and may require authentication, through the ATM security protocols, to access content. In such situations, the content may further include financial receipts, account-related documentation, reissued account cards, new account cards, prepaid cards, or the like. It may be advantageous to utilize a smart poster, as described herein, in communication with an ATM in order to provide a contactless interface to already-existing ATM's in the marketplace or, for ATM's already equipped with a contactless interface, to provide the poster application 344 that enables transfer of content to the mobile device 500 as described herein. Such an arrangement may eliminate costs associated with installation of new ATMs and/or significant software/hardware updates in order to provide such functionality to the ATM.

Figure 4:
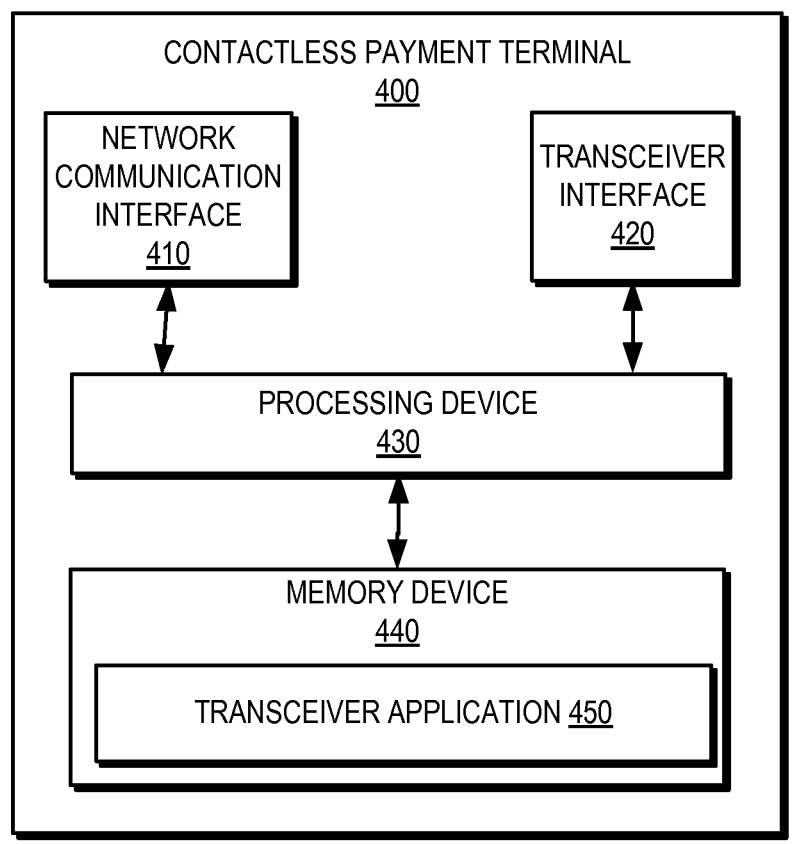
FIG. 4 illustrates a block diagram illustrating a payment terminal, in accordance with an embodiment of the invention.

The contactless apparatus 120 may also be a contactless payment terminal 400. FIG. 4 displays an embodiment of a contactless payment terminal 400. The contactless payment terminal 400 may include various features, such as a network communication interface 410, a processing device 430, a transceiver interface 420, and a memory device 440 that may include a transceiver application 450.

As used with respect to the contactless payment terminal 400, a "communication interface" may generally include a modem, server, transceiver, and/or other device for communicating with other devices on a network. The network communication interface 410 may be a communication interface having one or more communication devices configured to communicate with one or more other devices in the contactless transaction environment 100, such as the mobile device 500, the workstation 130, the processing system 140, other processing systems, data systems, etc.

In one embodiment, the transceiver interface 420 is a separate module that may generally include a transceiver, i.e., one or more antennas and and/or other electronic circuitry, devices, and software, for receiving electronic payment vehicle data when the mobile device 500 is held close to or tapped at the contactless payment terminal 400. In some embodiments, the transceiver interface 420 is part of the network communication interface 410. Furthermore, the transceiver interface 420 may also be used as an interface to send content to the mobile device 500 when the mobile device 500 is held close to or tapped at the contactless payment terminal 500.

An output device for the transceiver interface 420 may include a display that provides instructions regarding the steps for making a contactless transaction. In some embodiments where the contactless payment terminal 400 requests the user's signature, the display may also serve as a touchpad input device to input the user's signature via a stylus. Other output devices may include one or more LEDs or an audio speaker, both which may indicate to the user that data has been successfully received from the mobile device 500. A printer that can print paper receipts may also be incorporated into the contactless terminal 400. However, in one embodiment, receipts are electronically transferred to the mobile device 500. Other embodiments of the contactless payment terminal 400 may carry other input and output devices, such as a mouse, keyboard, button, touchpad, touch screen, microphone, speaker, light, joystick, switch, or the like.

As used with respect to the contactless payment terminal 400, a "processing device," 430 may generally refer to a device or combination of devices having circuitry used for implementing the communication and/or logic functions of a particular system. For example, a processing device 430 may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 430 may be configured to use the network communication interface 410 and/or the transceiver interface 420 to transmit and/or receive data and/or commands to and/or from the other devices that are visible in the contactless payment environment 100.

As used with respect to the contactless payment terminal 400, a "memory device" 440 may generally refer to a device or combination of devices that store one or more forms of computer-readable media for storing data and/or computer-executable program code/instructions. For example, in one embodiment, the memory device 440 may include any computer memory that provides an actual or virtual space to temporarily or permanently store data and/or commands provided to the processing device 430 when it carries out its functions described herein. In one embodiment, the memory device 440 stores a transceiver application 450. The transceiver application 450 may work in conjunction with the previously described transceiver interface 420 to receive electronic payment vehicle data when the mobile device is held close to or tapped at the contactless payment terminal 400. In some particular embodiments, the transceiver application 450 may also be configured to send data to the mobile device 500 when the mobile device 500 is held close to or tapped at the contactless payment terminal 400. The transceiver application 450 may also potentially provide a power source to the mobile device 500, in the event the primary power source is depleted, in order to power the mobile device 500 to complete the transaction.

Figure 5:
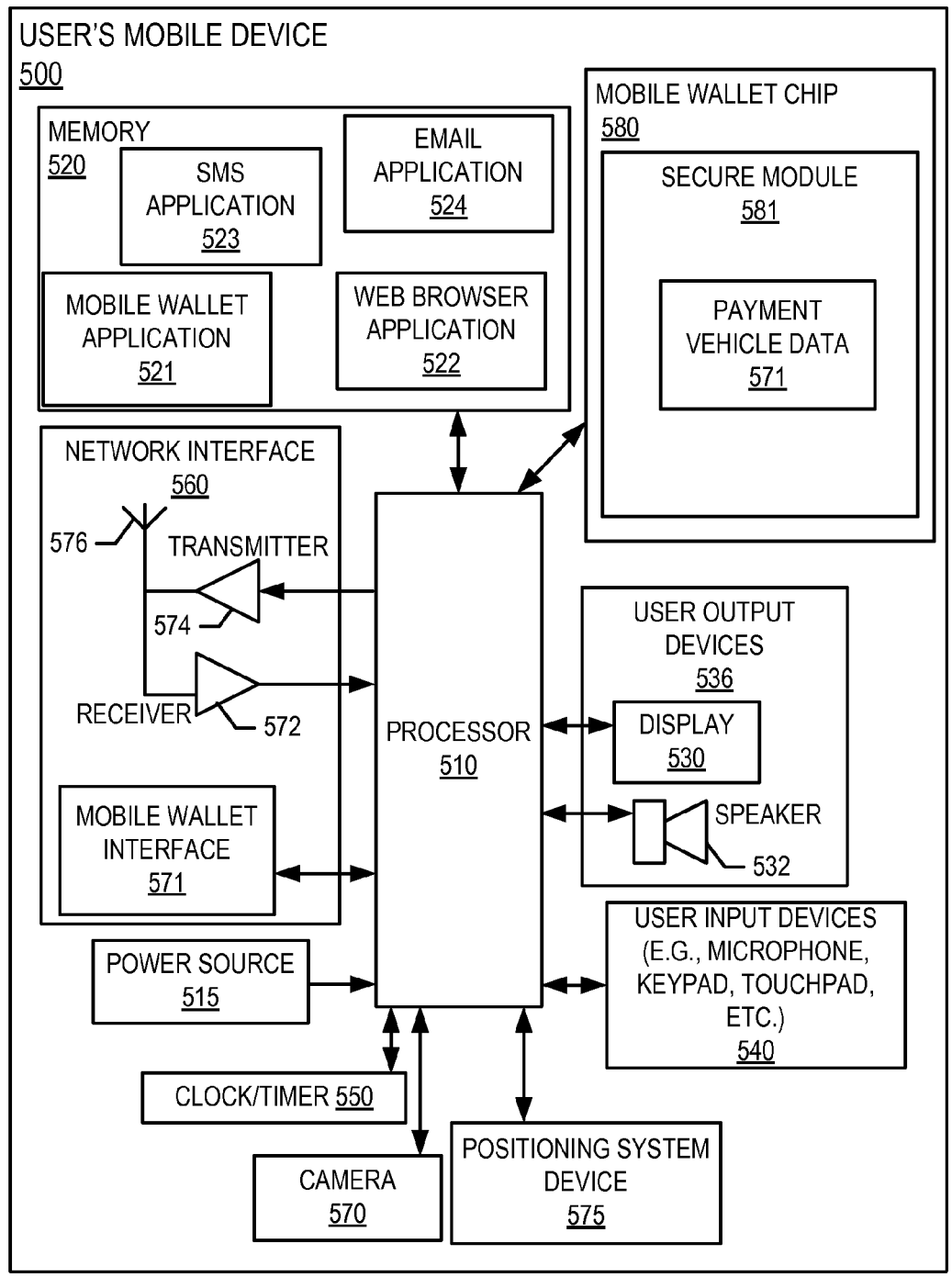
FIG. 5 illustrates a block diagram illustrating the mobile device of FIG. 1, in accordance with an embodiment of the invention.

Turning now to FIG. 5, illustrated is an embodiment of a mobile device 500 that may be configured to make a contactless transaction at a contactless apparatus 120. A "mobile device" 500 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 500 may generally include a processor 510 communicably coupled to such devices as a memory 520, user output devices 536, user input devices 540, a network interface 560, a power source 515, a clock or other timer 550, a camera 570, a positioning system device 575, one or more mobile wallet chips/memory 580, etc. The processor 510, and other processors described herein, may generally include circuitry for implementing communication and/or logic functions of the mobile device 500. For example, the processor 510 may include a digital signal processor device, a microprocessor device, and various analog to digital converters, digital to analog converters, and/or other support circuits. Control and signal processing functions of the mobile device 500 may be allocated between these devices according to their respective capabilities. The processor 510 thus may also include the functionality to encode and interleave messages and data prior to modulation and transmission. The processor 510 may additionally include an internal data modem. Further, the processor 510 may include functionality to operate one or more software programs, which may be stored in the memory 520. For example, the processor 510 may be capable of operating a connectivity program, such as a web browser application 522. The web browser application 522 may then allow the mobile device 500 to transmit and receive web content, such as, for example, location-based content and/or other web page content, according to a Wireless Application Protocol (WAP), Hypertext Transfer Protocol (HTTP), and/or the like.

The processor 510 may also be capable of operating a client application, such as a mobile wallet application 521. The mobile wallet application 521 may be downloaded from a server and stored in the memory 520 of the mobile device 500. Alternatively, the mobile wallet application 521 may be pre-installed and stored in a memory in the mobile wallet chip 580. In such an embodiment, the user may not need to download the mobile wallet application 521 from a server. In some embodiments, the mobile wallet application 521 may have a graphical user interface (GUI) that allows the user to perform various transactional processes. The GUI may also allow the user to set certain payment preferences or mobile wallet preferences.

The mobile wallet chip 580 includes a secure module 581 that may contain the payment vehicle data 571. The mobile wallet chip/memory 580 may be an integrated circuit, a microprocessor, a system-on-a-chip, a microcontroller, or the like. In one embodiment, the mobile wallet chip/memory 580 provides Near Field Communication (NFC) capabilities to the device 500.

Of note, while FIG. 5 illustrates the mobile wallet chip 580 as a separate and distinct element within the mobile device 500, it will be apparent to those skilled in the art that the mobile wallet chip 580 functionality may be incorporated within other elements in the mobile device 500. For instance, the functionality of the mobile wallet chip 580 may be incorporated within the mobile device memory 520. In a particular embodiment, the functionality of the mobile wallet chip 580 is incorporated in an element within the mobile device 500 that provides NFC capabilities to the mobile device 500. However, it is not necessary for the mobile wallet chip 580 to provide the NFC capabilities to the mobile device 500. The mobile device 500 may include a NFC providing element (and/or other wireless communication systems) (not shown) separate from the mobile wallet chip 580.

The secure module 581 may be a memory device within the mobile wallet chip 580. The secure module 581 may comprise payment vehicle data 571 associated with a plurality of payment vehicles. The payment vehicle data 571 may be data typical of standard card-type payment vehicles. For instance, payment vehicle data 571 for each payment vehicle that is stored in the secure module 581 may include the payment vehicle type, the payment vehicle number, the name associated with the payment vehicle, the expiration date of the payment vehicle, the security code associated with the payment vehicle, whether the payment vehicle is a credit or debit payment vehicle, gift card payment vehicle, etc. Additionally, the secure module 581 may include data indicating whether a payment vehicle is a default payment vehicle.

In the embodiment depicted in FIG. 5, since the secure module 581 is stored in a memory in the mobile wallet chip 580 and not in a memory 520 in the mobile device 500, the user may be able to transfer the mobile wallet chip 580, if the mobile wallet chip 580 is not irreversibly integrated into the mobile device 500, to another mobile device and the user may consequently have access to the payment vehicles in the mobile wallet chip 580 on a different mobile device. Alternatively, the secure module 581 could be stored in a secured sector of memory 520 or other data storage of the mobile device 500 and be transferred to a new mobile device 500. Furthermore, the mobile wallet application 500 and/or data within the secure modules may be additionally stored on an external apparatus or network to provide the user with the capability to readily transfer their mobile wallet system from one mobile device 500 to another or to restore their mobile wallet system to their device 500, if needed.

The processor 510 may be configured to use the network interface 560 to communicate with one or more other devices on the network 150. In this regard, the network interface 560 may include an antenna 576 operatively coupled to a transmitter 574 and a receiver 572 (together a "transceiver"). The processor 510 may be configured to provide signals to and receive signals from the transmitter 574 and receiver 572, respectively. These signals may include radio frequency signals emanating from the mobile device's transmitter 574 when the mobile device is tapped at or held or waved in close proximity to the contactless apparatus 120. These signals may also include radio frequency signals received at the mobile device's receiver 572 when the mobile device is tapped at or held or waved in close proximity to the contactless apparatus 120. In one embodiment, these radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 574 and receiver 572 at the mobile device may transmit and receive radio frequency signals, respectively, from a payment terminal within a distance of up to approximately 25 cm, and preferably from 0-20 cm, such as from 0-15 cm, and 0-10 cm.

As indicated earlier, the processor 510 may be configured to provide signals to and receive signals from the transmitter 574 and receiver 572, respectively. The signals may also include signaling information in accordance with the air interface standard of the applicable cellular system of the wireless telephone network that may be part of the network 150. In this regard, the mobile device 500 may be configured to operate with one or more air interface standards, communication protocols, modulation types, and access types. By way of illustration, the mobile device 500 may be configured to operate in accordance with any of a number of first, second, third, and/or fourth-generation communication protocols and/or the like. For example, the mobile device 500 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 500 may also be configured to operate in accordance with non-cellular communication mechanisms, such as via a wireless local area network (WLAN) or other communication/data networks.

The network interface 560 may also include a mobile wallet interface 571 in order to allow a user to execute some or all of the above-described processes with respect to the mobile wallet application 521 and the secure module 581 of the mobile wallet chip 580. The mobile wallet interface 571 may have access to the hardware, e.g., the transceiver, and software previously described with respect to the network interface 560.

The mobile device 500 may comprise a transceiver that works in conjunction with the secure module 581 of the mobile device 500. In one embodiment, the antenna and other hardware or software that transmit payment vehicle data from the secure module 581 of the mobile device 500 may be integrated into the secure module 581.

As described above, the mobile device 500 may have a user interface that includes user output devices 536 and/or user input devices 540. The user output devices 536 may include a display 530 (e.g., a liquid crystal display (LCD) or the like) and a speaker 532 or other audio device, which are operatively coupled to the processor 510. The user input devices 540, which may allow the mobile device 500 to receive data from a user 110, may include any of a number of devices allowing the mobile device 500 to receive data from a user, such as a keypad, keyboard, touch-screen, touchpad, microphone, mouse, joystick, other pointer device, button, soft key, and/or other input device(s).

The mobile device 500 may further include a power source 515. Generally, the power source 515 is a device that supplies electrical energy to an electrical load. In one embodiment, power source 515 may convert a form of energy such as solar energy, chemical energy, mechanical energy, etc. to electrical energy. Generally, the power source 515 in a mobile device 500 may be a battery, such as a lithium battery, a nickel-metal hydride battery, or the like, that is used for powering various circuits, e.g., the transceiver circuit, and other devices that are used to operate the mobile device 500. Alternatively, the power source 515 may be a power adapter that can connect a power supply from a power outlet to the mobile device 500. In such embodiments, a power adapter may be classified as a power source "in" the mobile device.

The mobile device 500 may also include a memory 520 operatively coupled to the processor 510. As used herein, memory may include any computer readable medium configured to store data, code, or other information. The memory 520 may include volatile memory, such as volatile Random Access Memory (RAM) including a cache area for the temporary storage of data. The memory 520 may also include non-volatile memory, which can be embedded and/or may be removable. The non-volatile memory may additionally or alternatively include an electrically erasable programmable read-only memory (EEPROM), flash memory or the like.

The memory 520 may store any of a number of applications or programs which comprise computer-executable instructions/code executed by the processor 510 to implement the functions of the mobile device 500 described herein. For example, the memory 520 may include such applications as a web browser application 522 and a mobile wallet application 521. The mobile wallet application 521 may be capable of performing one or more functions described above. These applications may also typically provide a graphical user interface (GUI) on the display 530. For instance, as described previously, the GUI for the mobile wallet application 521 may allow the user 110 to enter input to select a payment vehicle or to transmit to a contactless apparatus 120 or otherwise transact with the contactless apparatus 120.

The memory 520 may also store any of a number of pieces of information, and data, used by the mobile device 500 and the applications and devices that make up the mobile device 500 or are in communication with the mobile device 500 to implement the functions of the mobile device 500 and/or the other systems described herein. For example, the memory 520 may include such data as user authentication information to gain access to the mobile wallet application 521, user authentication information for each payment vehicle that is stored by or accessible via the mobile wallet application 521, user authentication information to access the secure module 581 of the mobile wallet chip 580, etc. In other embodiments, this authentication information may be stored in a memory of the mobile wallet chip 580.

Figure 6:
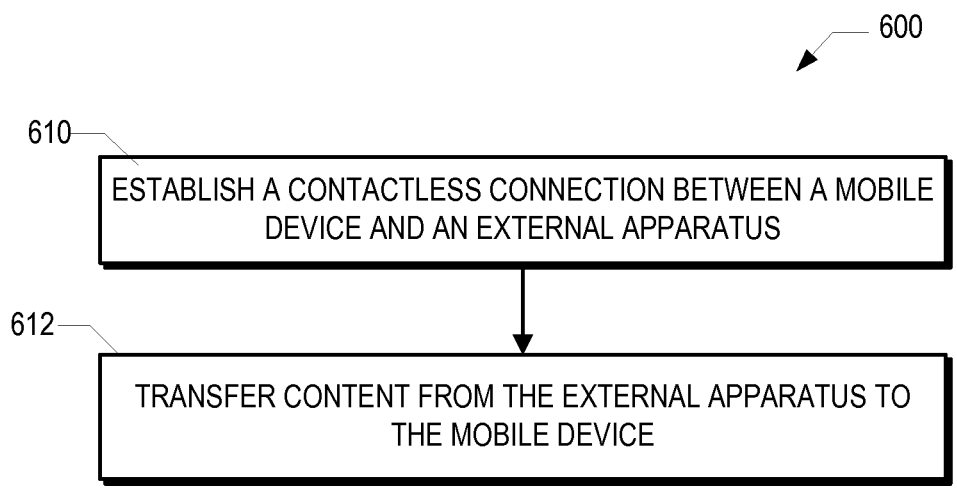
FIG. 6 is a flow diagram of a method for transferring content to a mobile device, in accordance with an embodiment of the invention.

Referring now to FIG. 6, illustrated is a high level flow diagram of a method 600 for transferring content to a mobile device 500. At block 610, a contactless connection between the mobile device 500 and an external apparatus 120 is established. In one embodiment, the mobile device 500 is a mobile phone. In particular embodiments the contactless connection is an NFC connection. In some embodiments, the external apparatus 120 is an ATM 200. In other embodiments, the external apparatus 120 is a smart poster 300. In still other embodiments, the external apparatus 120 is a contactless payment terminal 400. In one particular embodiment, the external apparatus 120 is a smart poster 400 in operative communication with an ATM. In establishing the contactless connection, the user may be required to provide authentication.

After the contactless connection is established, the method moves to block 612 where the content is transferred from the external apparatus 120 to the mobile device 500. As noted above, typical content to be transferred to the mobile device 500 includes coupons, ads, or offers, images, financial receipts, account-related documentation, a reissued card, a new card, a prepaid card, or combinations thereof. In one embodiment, the content comprises one or more coupons, ads, or offers. In a particular embodiment, at least some of the content is third-party content, such as third-party coupons, ads, or offers.

Generally, the content may be "pushed" from the external apparatus 120 to the mobile device 500. Content "pushed" to a mobile device 500 from an apparatus may be done so without the user's authorization or presented to the user such that the user may confirm that they wish to receive such content. For instance, the user may be communicating with the external apparatus 120 to perform a particular transaction. Prior to, during, or following the external apparatus's 120 completion of the requested transaction, the external apparatus 120 may present content for transfer to the user. The content may be automatically transferred. For instance, the external apparatus 120 may wish to push a reissued account card, a new account card, or a prepaid card to update the user's payment vehicle information. Furthermore, the customer may have previously opted to receive other content such as coupons, ads, offers and the like. In some embodiments, the external apparatus 120 first prompts the user that content is available for transfer to the mobile device and the user may opt to receive such content. Upon opting to receive the content, the external apparatus 120 transfers the content to the mobile device 500.

In another embodiment, the content may be "pulled" from the external apparatus 120 to the mobile device 500. Generally, in such embodiments, the user establishes contactless communication with the external apparatus 120 with at least some purpose of receiving the content. For instance, in one example a financial institution offers a program to its customers such that the customer may obtain coupons or other offers from the financial institution or third-party businesses. To retrieve such coupons and offers, the user may establish a contactless connection with a financial institution-specific external apparatus 120 such as an ATM 200 and "pull" such coupons and offers from the external apparatus 120 to the mobile device 500. In such cases, the user may opt to receive only certain types of content (e.g., restaurant only coupons) or may opt to receive all content available.

In embodiments wherein the external apparatus 120 is an ATM, it is often beneficial for the user's mobile device 500 to include a financial institution-specific mobile wallet application or program that is compatible with the ATM to assist in optimal transfer and organization of content. With such an application, in some embodiments, the user may set one or more user preferences to optimize the content the user wishes to receive. The content may be automatically pushed or pulled to the mobile device 500 based on user preferences set by the user.

Figure 7:
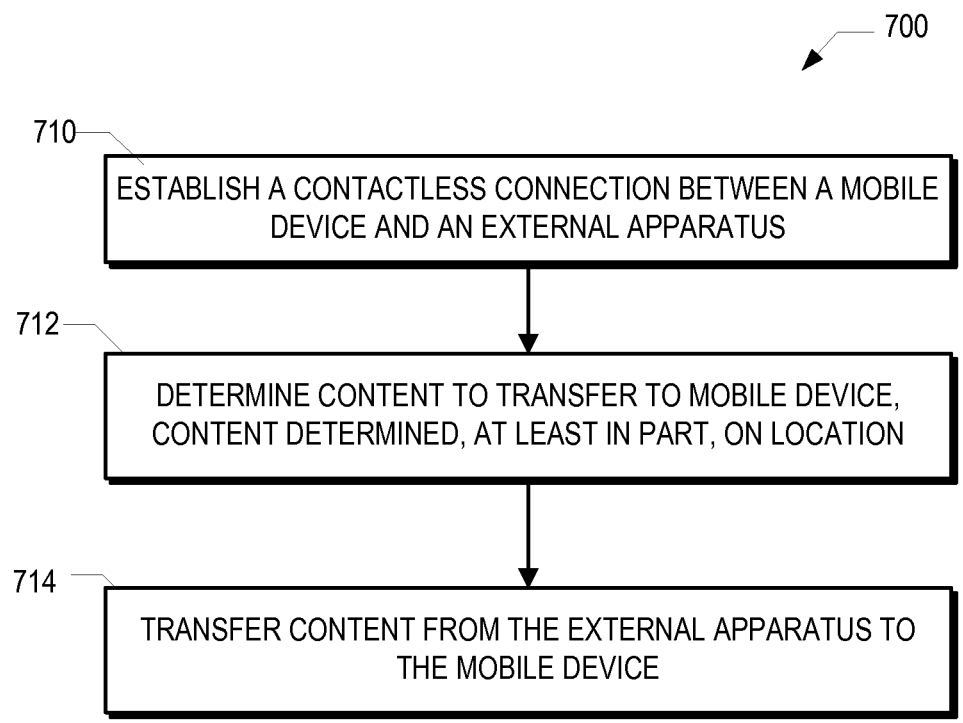
FIG. 7 is a flow diagram of a method for transferring content to a mobile device, in accordance with an embodiment of the invention.

Turning to FIG. 7, illustrated is a high level flow diagram of a method 700 for transferring content to a mobile device 500. As illustrated, at block 710, a contactless connection between the mobile device 500 and an external apparatus 120 is established. At block 712, the external apparatus 120 determines what content to transfer to the mobile device 500, wherein the content is determined, at least in part, based on the user's location. At block 714, the content is transferred from the external apparatus 120 to the mobile device 500. Thus, the method of FIG. 7 differs from FIG. 6 only with regard to block 712.

Regarding block 712, at least one coupon, ad, offer, etc. in the content transferred to the mobile device 500 is selected based on the user's location. The user's location may be determined by any means. Perhaps the easiest method of determining the user's location is to simply utilize the location of the external apparatus 120. If, however, another method is required, such as, for example, the external apparatus 120 is not equipped to provide such data to the network; the user's location may be transmitted to the external apparatus 120 from the mobile device 500. The mobile device 500 may be equipped with a GPS device for determining precise location. Alternatively, the mobile device 500 may disclose general location information such as the city/area based on the mobile device's connection to a mobile communication tower or the like.

Utilizing the user's location to determine at least a portion of the content to transfer may be beneficial, particularly, for instance, for marketing purposes. For example, if the user is communicating with an ATM located within a reasonable distance (e.g., within a few blocks, within a mile, within 5 miles, within the same city, within the same county, etc.) from a third-party business with which the financial institution associated with the ATM has contracted with, the ATM may push (or the mobile device 500 may pull) a coupon, ad, offer, etc. from the ATM for the nearby third-party business. Such a system may have the effect of "impulse buying" on the user and yield a good likelihood that the user would visit the third-party business to take advantage of the offer.

Furthermore, location-specific content may be a significant advantage in, for instance, a marketing program which the user may opt to participate. For example, the user may approach an external apparatus 120, such as an ATM, and opt to receive content specific to the area. For instance, the user may be out-of-town and obtain all content available for the location and utilize such content in determining where to dine, where to stay, what attractions to see, etc.

Additionally, incorporating location data into the determination of the content to transfer to the mobile device 500 may serve to optimize the system such that the user does not receive an exorbitant amount of content that he may not be interested in. For example, a user located in Miami, Fla. would likely not be interested in receiving a coupon for a snow shovel available at a home improvement store. Optimizing the content transferred to the mobile device 500 may serve attract new users or maintain current users as unwanted or "junk" content transferred would be limited.

Figure 8:
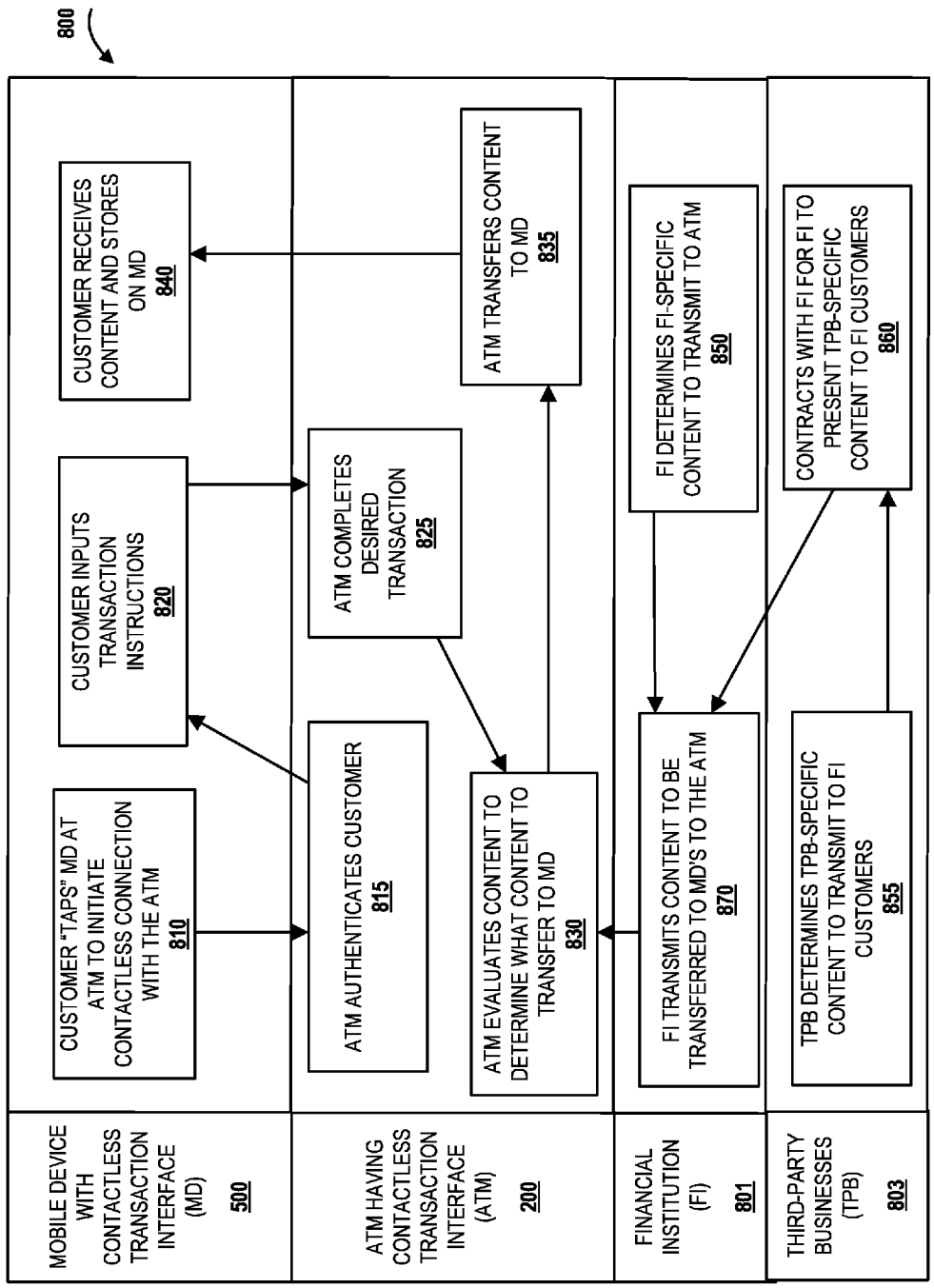
FIG. 8 is a mixed block and flow diagram of a method for transferring content to a mobile device, in accordance with an embodiment of the invention.

FIG. 8 illustrates a mixed block and flow diagram of a system 800 for transferring content from an ATM 200 to a mobile device 500, in accordance with an embodiment of the present invention. It will be understood that the system 800 illustrated is an example embodiment. As shown, the system 800 includes a mobile phone 500 having a contactless transaction interface, an ATM 200 having a contactless transaction interface, a financial institution 801, and third-party businesses 803.

In this example embodiment, the mobile device 500 is operatively connected to the ATM 200 via the contactless interface of the mobile device 500 and the contactless interface of the ATM 200. In addition, the mobile device 500 and/or the ATM 200 may be operatively connected to one or more networks, servers, etc. The ATM 200 is maintained by the financial institution 801 and the mobile device 500 is preferably, but not necessarily, maintained by a customer of the financial institution 801.

As represented by block 810, the customer taps the mobile device 500 at the ATM 200 to initiate a contactless connection with the ATM. For example, the customer may "tap" the mobile device 500 by positioning the contactless interface of the mobile device 500 within close proximity of the contactless interface of the ATM 200, such that a connection is established. In one embodiment, the contactless connection is an NFC connection.

Block 815 represents the ATM 200 authenticating the customer. Authentication may be by any typical means as understood by those skilled in the art, but generally requires the customer to enter a PIN associated with the account the customer wishes to authenticate himself to the ATM 200. Of note, while FIG. 8 illustrates the contactless connection being established prior to ATM 200 authentication, the customer may first authenticate himself prior to the contactless connection being established. For instance, the customer may input authentication information on his mobile device 500 and such transfer such data to the ATM 200 upon establishing the contactless connection. Alternatively, the customer may authenticate, for instance, by swiping a debit card associated with the account and entering a PIN at the ATM 200 prior to establishing the contactless connection. Furthermore, ATM authentication may not be required for certain transactions. For instance, ATM authentication may not be necessary for transactions that do not involve customer- or account-specific information. In one embodiment, the customer may initiate a contactless connection with the ATM 200 to retrieve at least a portion of the content available to the customer.

At block 820, the customer inputs instructions to the ATM 200 to execute the desired transaction. Of course, the desired transaction may be any type of ATM transaction such as, for example, withdrawing funds, depositing funds, transferring funds, balance checks, ordering products such as checks, and the like. Block 825 represents the ATM 200 completing the customer's desired transaction.

As illustrated in FIG. 8, the ATM 200 then evaluates the content and determines what content to transfer to the mobile device 500. In one embodiment, the ATM 200 utilizes an algorithm including at least some type of customer-specific data, such as the customer's location, age, sex, user preferences previously set, active input during the transaction by the customer indicating what type of content he wishes to receive, etc. In other embodiments, the ATM 200 simply determines to transfer a "deal of the day" offer or some set content to be transferred and does not rely on any customer-specific data. At blocks 835 and 840, the ATM 200 transfers the content to the mobile device 500 and the customer receives and stores the content on the mobile device 500, respectively.

The content transferred to the mobile device 500 may be financial institution-specific content (i.e., content relating to the financial institution 801 that maintains the ATM 200) or the content may be third-party business specific (i.e., content not relating specifically to the financial institution 801). Regarding, financial institution-specific content, block 850 represents the financial institution 801 determining what financial institution-specific content to transfer to the ATM 200. The financial institution-specific content may be generally any content related to the financial institution 801. As an example, the content may include offers to upgrade the customer's account, offers to open a new account, an offer for the customer to borrow funds at a specified rate, replacement or new account card data, account-related documentation, etc. Once the financial institution 801 determines the financial institution-specific content to be transferred, the financial institution then transmits the content to the ATM 200 to be transferred to one or more mobile devices 500, as represented by block 870. It should be noted that while FIG. 8 illustrates the content being transferred to the ATM 200 to be stored, for instance, on a database within the ATM 200 at a time prior to the establishing of a contactless connection between the customer's mobile device 500 and the ATM 200, it will be appreciated that the content may be transferred to the ATM 200 upon establishing the connection (represented in block 810) or after the connection has been established. For instance, the content may be stored, for instance, in a database connected to a network that is in operative communication with the ATM 200. Thus, in one embodiment, the content is transferred from a database within a network to the ATM 200 upon or after establishing a contactless connection between the mobile device 500 and the ATM 200.

With regard to third-party business specific content, block 855 represents a third-party business 803 determining what content to transmit to financial institution 801 customers. Similarly, the content may be any content. As an example, the content may include coupons, ads or offers. Once the third-party business 803 has determined what content to transfer, the third-party business may then enter into a contract with the financial institution 801 for the financial institution 801 to present the third-party business specific data to the financial institution customers, as represented by block 860. Of course, a contractual arrangement may not be necessary in all instances, such as, for example, if the third-party business 803 has a prior business relationship with the financial institution 801, if a contract between the parties already exists, or if the parties deem a contract unnecessary. Once the arrangement between the financial institution 801 and the third-party business 803 is settled, the financial institution 801 may then transmit the content to the ATM 200 to be transferred to one or more mobile devices 500. As with the financial institution-specific data discussed above, the third-party business specific data is not necessarily transferred to the ATM prior to the establishment of a contactless connection with the customer's mobile device 500, but may, for instance, be stored at another point within a network and transmitted to the ATM 200 when necessary to be transferred to the mobile device(s) 500.

Thus, present embodiments of the invention disclosed in detail above provide systems, methods, and computer program products for transferring content to a mobile device, particularly, transferring content from an apparatus configured for contactless transactions to a mobile device. As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present invention may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for transferring content to a mobile device comprising:
    establishing a contactless connection between a mobile device and an external apparatus, the mobile device comprising a memory device, a user interface configured to present information to a user, a communication device, and a processing device operatively in communication with the memory device and the communication device, wherein the external apparatus is an automated teller machine;
    authorizing user access to financial information based at least in part on the established contactless connection between the mobile device and the external apparatus;
    receiving available content, wherein the available content includes financial institution-specific content and third-party business-specific content, the financial institution-specific content comprising at least one of offers to upgrade an account, offers to open a new account, offers to borrow funds, offers for card replacements, a prepaid card, financial receipts, or account-related documentation, wherein the third-party business-specific content comprises at least one of coupons, ads, or offers for a third party business;
    determining content to transfer to the mobile device based on customer-specific data, location of the external apparatus, and the available content, wherein the customer-specific data comprises a user's location, age, sex, previously set preferences, and active input during a transaction;
    prompting the user that the determined content is available for transfer from the external apparatus to the mobile device;
    receiving input from the user to transfer the determined content to the mobile device; and
    transferring, contactlessly, the determined content from the external apparatus to the mobile device, the transferred content being stored, at least temporarily, in the memory device of the mobile device.

2. The method of claim 1, wherein the mobile device is a mobile phone.

3. The method of claim 1, wherein the contactless connection is a near field communication (NFC) connection.

4. The method of claim 1, wherein the external apparatus is a smart poster.

5. The method of claim 1, wherein the external apparatus is a contactless payment terminal.

6. The method of claim 1, wherein the user location is determined by the location of the external apparatus.

7. The method of claim 1, wherein the user location is determined by a global positioning system (GPS).

8. The method of claim 1, wherein the determined content is pushed from the external apparatus to the mobile device.

9. The method of claim 1, wherein the determined content is pulled from the external apparatus to the mobile device.

10. The method of claim 1, wherein the mobile device comprises a mobile wallet with a financial institution-specific mobile wallet application or program that is compatible with the ATM.

11. The method of claim 10, wherein the determined content is automatically pushed or pulled to the mobile device based on user preferences set by the user.

12. An apparatus for transferring content to a mobile device comprising:
    a memory device;
    a communication device; and
    a processing device operatively coupled to the memory device and the communication device, wherein the processing device is configured to execute computer-readable program code to:
        establish a contactless connection with a mobile device and an external apparatus,
    wherein the external apparatus is an automated teller machine;
        authorize user access to financial information based at least in part on the established contactless connection between the mobile device and the external apparatus;
        receive available content, wherein the available content includes financial institution-specific content and third-party business-specific content, the financial institution-specific content comprising at least one of offers to upgrade an account, offers to open a new account, offers to borrow funds, offers for card replacements, a prepaid card, financial receipts, or account-related documentation, wherein the third-party business-specific content comprises at least one of coupons, ads, or offers for a third party business;
        determine content to transfer to the mobile device based on customer-specific data, location of the external apparatus, and the available content, wherein the customer-specific data comprises a user's location, age, sex, previously set preferences, and active input during a transaction;
        prompt the user that the determined content is available for transfer from the external apparatus to the mobile device;
        receive input from the user to transfer the determined content to the mobile device; and
        transfer, contactlessly, the determined content from the external apparatus to the mobile device, such that the transferred content is stored, at least temporarily, in the mobile device.

13. The apparatus of claim 12, wherein the mobile device is a mobile phone.

14. The apparatus of claim 12, wherein the contactless connection is a near field communication (NFC) connection.

15. The apparatus of claim 12, wherein the apparatus is a smart poster.

16. The apparatus of claim 12, wherein the external apparatus is a contactless payment terminal.

17. The apparatus of claim 12, wherein the user location is determined by the location of the external apparatus.

18. The apparatus of claim 12, wherein the user location is determined by a global positioning system (GPS).

19. The apparatus of claim 12, wherein the processing device is further configured to execute computer-readable program code to push the determined content from the apparatus to the mobile device.

20. The apparatus of claim 12, wherein the processing device is further configured to execute computer-readable program code to allow the mobile device to pull the determined content from the apparatus to the mobile device.

21. The apparatus of claim 12, wherein the ATM is compatible with a financial institution-specific mobile wallet application for a mobile device.

22. The apparatus of claim 21, wherein the processing device is further configured to execute computer-readable program code to automatically push the determined content to the mobile device or allow the mobile device to pull the determined content to the mobile device based on user preferences set by the user.

23. A computer program product for transferring content to a mobile device, the computer program product comprising a non-transitory computer-readable medium comprising:
- a first set of code for establishing a contactless connection between a mobile device and an external apparatus, wherein the external apparatus is an automated teller machine;
- a second set of codes for authorizing user access to financial information based at least in part on the established contactless connection between the mobile device and the external apparatus;
- a third set of codes for receiving available content, wherein the available content includes financial institution-specific content and third-party business-specific content, the financial institution-specific content comprising at least one of offers to upgrade an account, offers to open a new account, offers to borrow funds, offers for card replacements, a prepaid card, financial receipts, or account-related documentation, wherein the third-party business-specific content comprises at least one of coupons, ads, or offers for a third party business;
- a fourth set of codes for determining content to transfer to the mobile device based on customer-specific data, location of the external apparatus, and the available content, wherein the customer-specific data comprises a user's location, age, sex, previously set preferences, and active input during a transaction;
- a fifth set of codes for prompting the user that the determined content is available for transfer from the external apparatus to the mobile device;
- a sixth set of codes for receiving input from the user to transfer the determined content to the mobile device; and
- a seventh set of code for transferring the determined content from the external apparatus to the mobile device, such that the transferred content is stored, at least temporarily, in the mobile device.

24. The computer program product of claim 23, wherein the mobile device is a mobile phone.

25. The computer program product of claim 23, wherein the contactless connection is a near field communication (NFC) connection.

26. The computer program product of claim 23, wherein the external apparatus is a smart poster.

27. The computer program product of claim 23, wherein the external apparatus is a contactless payment terminal.

28. The computer program product of claim 23, wherein the user location is determined by the location of the external apparatus.

29. The computer program product of claim 23, wherein the user location is determined by a global positioning system (GPS).

30. The computer program product of claim 23, wherein the fourth set of code is configured to push the determined content from the external apparatus to the mobile device.

31. The computer program product of claim 23, wherein the fourth set of code is configured to allow the mobile device to pull the determined content from the external apparatus to the mobile device.

32. The computer program product of claim 23, further comprising a fifth set of code to make the computer program product compatible with a financial institution-specific mobile wallet application or program.

33. The computer program product of claim 32, further comprising a fifth set of code to automatically push the determined content to the mobile device or allow the mobile device to pull the determined content to the mobile device based on user preferences set by the user.

\* \* \* \* \*